US009792820B1

(12) United States Patent
Russell, Jr.

(10) Patent No.: US 9,792,820 B1
(45) Date of Patent: Oct. 17, 2017

(54) AUDIBLE AND VISUAL ALERT WARNING SYSTEM FOR APPROACHING VEHICLES

(71) Applicant: JRussell Consulting LLC, St. Charles, MO (US)

(72) Inventor: John R. Russell, Jr., St. Charles, MO (US)

(73) Assignee: JRussell Consulting LLC, St. Charles, MO (US)

( * ) Notice: Subject to any disclaimer, the term of this patent is extended or adjusted under 35 U.S.C. 154(b) by 0 days.

(21) Appl. No.: 15/471,415

(22) Filed: Mar. 28, 2017

Related U.S. Application Data

(60) Provisional application No. 62/318,989, filed on Apr. 6, 2016.

(51) Int. Cl.

| | |
|---|---|
| ***G08B 21/00*** | (2006.01) |
| ***G08G 1/16*** | (2006.01) |
| ***G08G 1/0962*** | (2006.01) |
| ***B60Q 5/00*** | (2006.01) |
| ***B60Q 1/52*** | (2006.01) |
| ***B60Q 1/26*** | (2006.01) |
| ***H04R 1/40*** | (2006.01) |
| ***H04R 1/34*** | (2006.01) |

(52) U.S. Cl.
CPC ........... *G08G 1/166* (2013.01); *B60Q 1/2696* (2013.01); *B60Q 1/525* (2013.01); *B60Q 5/006* (2013.01); *G08G 1/09623* (2013.01); *H04R 1/345* (2013.01); *H04R 1/403* (2013.01); *B60Q 2400/20* (2013.01)

(58) Field of Classification Search
CPC ..................................................... G08G 1/166
USPC ............... 340/435, 473, 908, 908.1; 701/301
See application file for complete search history.

(56) References Cited

U.S. PATENT DOCUMENTS 5,677,669 A * 10/1997 Walkley, IV .......... B60Q 1/245 340/473
9,489,841 B1 * 11/2016 Huggins ................ G08G 1/056

* cited by examiner

*Primary Examiner* — Jeffery Hofsass
(74) *Attorney, Agent, or Firm* — Senniger Powers LLP

(57) ABSTRACT

An alert warning system. In an aspect, alert lights are configured to provide a visual alert and a sound system is configured to provide an audible alert to an approaching vehicle operator. The visual and audible alerts are responsive to a two-part initiation event. The first part of the event initiates the visual alert when the approaching vehicle reaches a first predetermined distance from a safety target. The second part of the event initiates the audible alert when the approaching vehicle reaches a second predetermined distance from the safety target. The second predetermined distance is less than the first predetermined distance.

20 Claims, 10 Drawing Sheets

AUDIBLE AND VISUAL ALERT WARNING SYSTEM FOR APPROACHING VEHICLES

CROSS-REFERENCE TO RELATED APPLICATION

This application claims priority from U.S. Provisional Patent Application Ser. No. 62/318,989, filed Apr. 6, 2016, entitled "Alert Warning System." The entire contents of the above-identified application are expressly incorporated herein by reference, including the contents and teachings of any references contained therein.

BACKGROUND

Vehicle operators frequently engage in secondary tasks, which can result in what is typically referred to as distracted driving. In recent surveys, about two-thirds of all drivers reported using a cell phone while driving. And a study by the Virginia Tech Transportation Institute revealed that texting while driving increases the risk of being involved in a critical incident by 23 times. As an example of the dangers of distracted driving, 13.8 percent of fatal traffic crashes from 2011-2013 in the state of Missouri involved at least one distracted driver.

Mobile road crews often use signs mounted on vehicles to warn motorists of operations ahead and to divert vehicles before they reach the work zones. Vehicle-mounted signs and the like use high-intensity rotating, flashing, oscillating, or strobe lights. Unfortunately, the effectiveness of a warning sign is greatly diminished by distracted driving. In other words, a motorist must notice a warning sign for it to be effective.

SUMMARY

Aspects of the invention provide a two-stage warning that employs an audible alert emitted by a sound system in conjunction with a visible alert emitted by lights on a truck mounted attenuator (TMA), crash absorption device, or the like. If an oncoming motorist fails to react to the visible alert and approaches within an unsafe distance of the TMA, the TMA operator activates a unique audible alert to grab the motorist's attention. According to another aspect of the invention, a camera activation system automatically enables the visible alert and/or audible alert.

In an aspect, an alert warning system includes lights and a sound system. The lights are configured to provide a visual alert to an operator of an approaching vehicle, and the sound system is configured to provide an audible alert to the operator. The visual and audible alerts are responsive to a two-part initiation event. A first part of the initiation event initiates the visual alert when the approaching vehicle reaches a first predetermined distance from a safety target. A second part of the initiation event initiates the audible alert when the approaching vehicle reaches a second predetermined distance from the safety target. The second predetermined distance is less than the first predetermined distance.

In another aspect, a method includes providing a visual alert to an operator of a vehicle approaching a protected zone by emitting light from light units when the vehicle reaches a first predetermined distance from the protected zone. The method also includes providing an audible alert to the operator of the vehicle by emitting sound from a sound system when the vehicle reaches a second predetermined distance from the protected zone. The second predetermined distance is less than the first predetermined distance.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
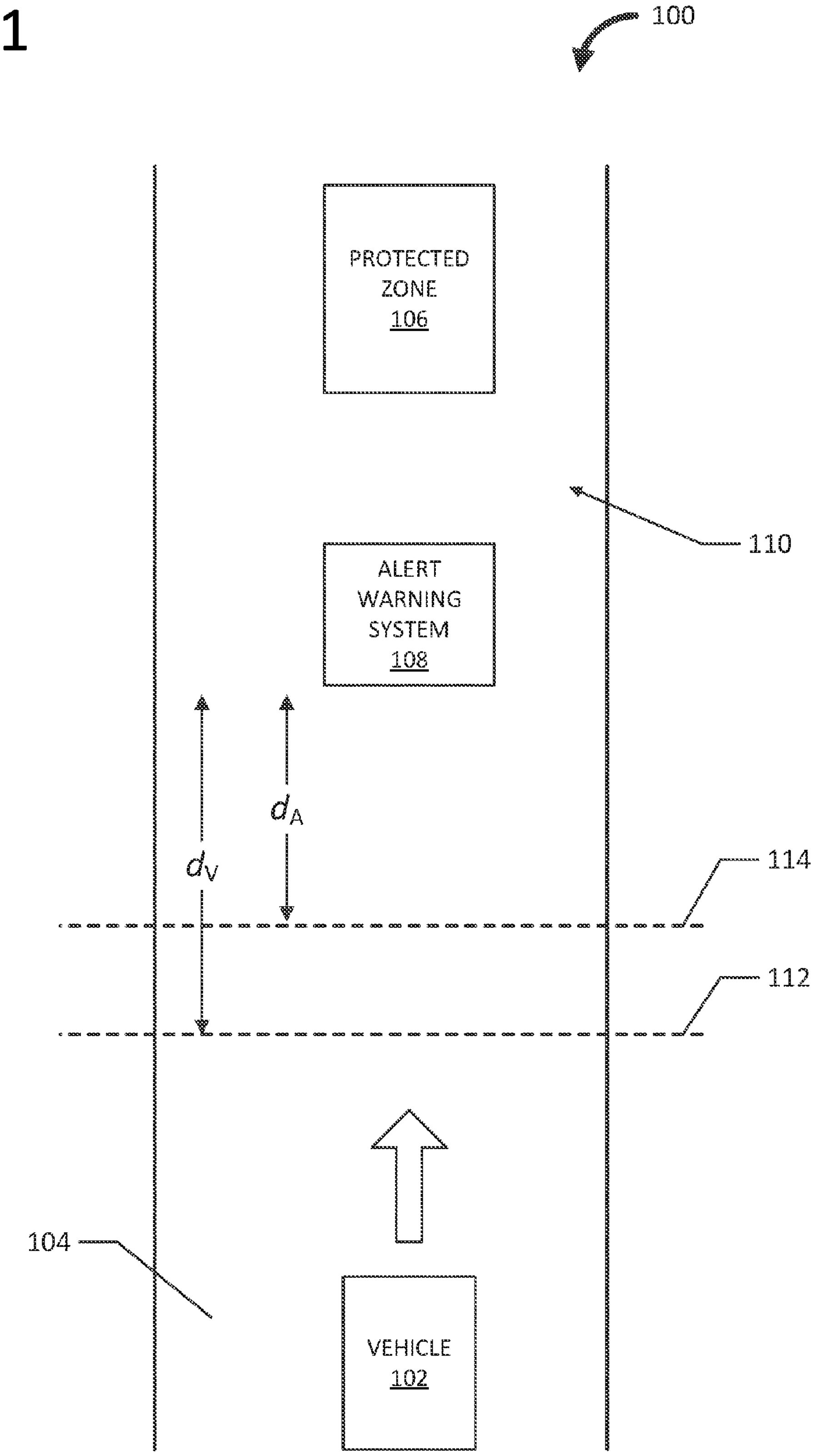
FIG. 1 illustrates an exemplary environment within which an embodiment of the invention may be incorporated.

FIG. 1 illustrates an exemplary environment, generally indicated at 100, within which aspects of the present invention may be utilized. The environment 100 includes a vehicle 102 (e.g., operated by a motorist) traveling on a thoroughfare 104 towards a protected zone 106 within the thoroughfare 104. Located between the protected zone 106 and the vehicle 102 is an alert warning system (AWS) 108. In an embodiment, the distance between protected zone 106 and the AWS 108 is referred to as a buffer zone 110. A visual alert threshold 112 and an audible alert threshold 114 are each located between vehicle 102 and AWS 108. The visual alert threshold 112 is a first distance, $d_V$, from AWS 108, and the audible alert threshold 114 is a second distance, $d_A$, from AWS 108. In an embodiment, the second distance ($d_A$) is less than the first distance ($d_V$).

In an embodiment, environment 100 is located on land, thoroughfare 104 is a road, highway, and the like, and vehicle 102 is a car, truck, bus, and the like. In another embodiment in which environment 100 is located on land, thoroughfare 104 is a railway and the like, and vehicle 102 is a train, a tram, and the like. Although the environment is described as being on land, one having ordinary skill in the art will understand that thoroughfares comprising bridges, tunnels, and the like are within the scope of the invention. In another embodiment, environment 100 is located on water (e.g., river, lake, ocean, etc.), thoroughfare 104 is a strait, channel, waterway, and the like, and vehicle 102 is a boat, ship, and the like. In yet another embodiment, environment 100 is located in the air, thoroughfare 104 is an airway and the like, and vehicle 102 is an airplane, a helicopter, and the like. One having ordinary skill in the art will understand that environment 100 may encompass multiple combinations of environments, thoroughfares, and/or vehicles. For example, thoroughfare 104 may be a runway located on land and vehicle 102 may be an airplane coming in for landing.

For sake of brevity, aspects of the invention are described below in an embodiment in which thoroughfare 104 is a roadway, protected zone 106 is a construction work zone, and AWS 108 is mounted on a shadow truck having a truck-mounted attenuator (TMA), crash absorption device, or the like. However, one of ordinary skill in the art will understand that aspects of the invention may be incorporated within other embodiments. For example, in an embodiment protected zone 106 includes a disabled vehicle, accident scene, temporary road closure (e.g., parade route, etc.), moving construction zone, stationary construction zone, or the like and AWS 108 is mounted on a tow truck, law enforcement vehicle, emergency response vehicle, or the like. In yet another embodiment, protected zone 106 is a school zone and AWS 108 is mounted adjacent thoroughfare 104, such as on sign posts or the like. Although protected zone 106 is illustrated within thoroughfare 104 in FIG. 1, one of ordinary skill in the art will understand that protected zone 106 may be adjacent to thoroughfare 104 (e.g., a disabled vehicle on the side of a road, etc.).

Figure 2:
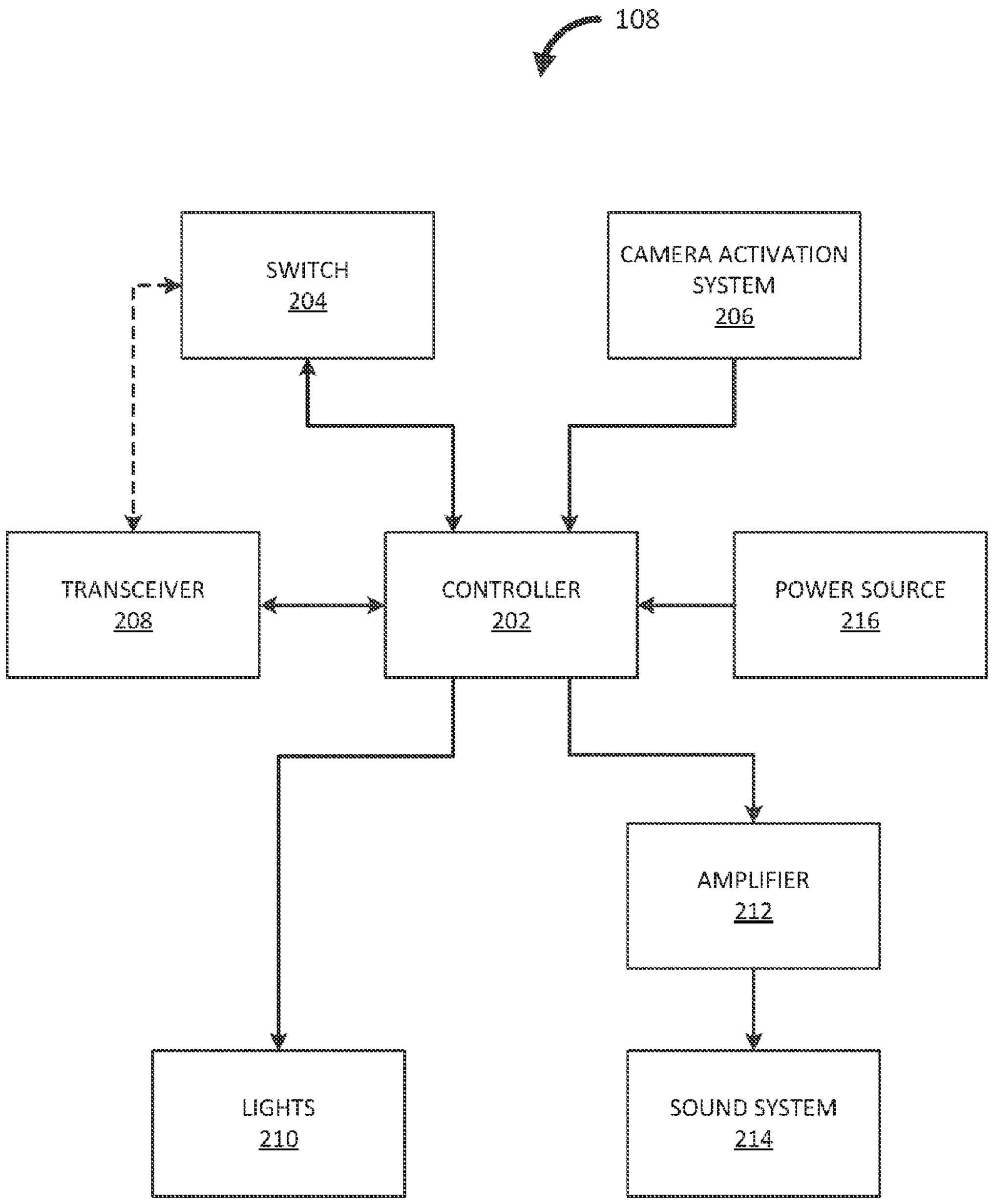
FIG. 2 is a block diagram of an exemplary alert warning system according to an embodiment.

FIG. 2 is a block diagram of AWS 108 according to an embodiment. The AWS 108 includes a controller 202, a switch 204, a camera activation system 206, a wireless communications transceiver 208, an amplifier 210, a sound system 212, lights 214, and an electrical power source 216. The controller 202 is configured to receive inputs from the switch 204, camera activation system 206, and/or transceiver 208 and provide control outputs to switch 204, transceiver 208, amplifier 210, sound system 212, and/or lights 214. In an embodiment, controller 202 is also configured to distribute power from the power source 216 to switch 204, camera activation system 206, transceiver 208, amplifier 210, sound system 212, and/or lights 214. The controller 202 may be electronic circuitry, a microcontroller, a processor, or the like. In an embodiment, controller 202 includes a computer-readable storage medium (e.g., memory device) configured for storing computer-executable instructions and/or data values. In accordance with an aspect of the invention, switch 204 is configured for attaching to a safety (e.g., breakaway) lanyard, such as via a steel metal split ring (e.g., key ring).

Figure 3:
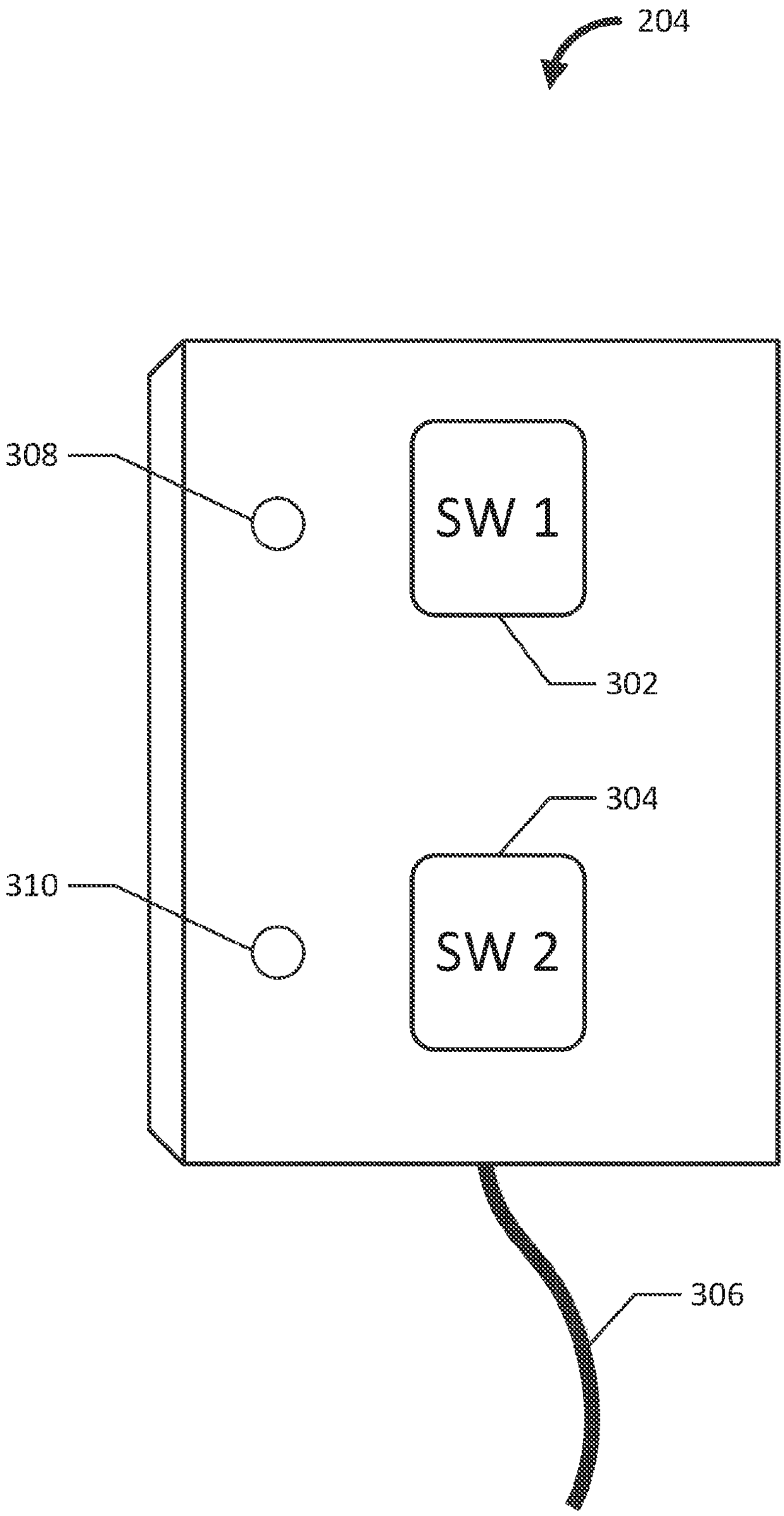
FIG. 3 illustrates an exemplary switch of the alert warning system of FIG. 2 according to an embodiment.

The switch 204 is configured to initiate a visual alert via lights 210 and/or an audible alert via amplifier 212 and/or sound system 214. FIG. 3 illustrates switch 204 as a handheld unit for manual alert initiation according to an embodiment. The switch 204 includes two momentary buttons, visual alert button 302 and audible alert button 304. In an embodiment, buttons 302 and 304 are backlit when AWS 108 is powered on. In an embodiment, switch 204 is communicatively coupled to controller 202 via a wired communication medium 306, such as any medium that allows data to be physically transferred through serial or parallel communication channels (e.g., copper, wire, optical fiber, computer bus, etc.).

In another embodiment, switch 204 includes a remote logic module and an antenna and is communicatively coupled to controller 202 via a wireless communication channel, such as the 2.4 GHz ISM band using proprietary encoded data streams with 16-bit cyclic redundancy check (CRC) error handling. In accordance with an aspect of the invention, the wireless communication embodiment of switch 204 may be referred to as a key fob. Additional wireless communication channels include, but are not limited to, telecommunications networks that facilitate the exchange of data, such as those that operate according to the IEEE 802.11 (e.g., Wi-Fi) and/or IEEE 802.15 (e.g., Bluetooth) protocols, for example. In accordance with an aspect of the invention, utilizing a wireless communication channel enables an effective outdoor range of about 750 feet between switch 204 and controller 202.

In the wireless communication embodiment, switch 204 has its own 32-bit electronic serial number (ESN) with over 4 million unique values available for pairing to transceiver 208 and/or controller 202. In accordance with an aspect of the invention, switch 204 (e.g., key fob) can be paired to an unlimited number of AWS 108 modules (e.g., controller 202) and each AWS 108 module (e.g., controller 202) can be paired with up to sixty switches 204 (e.g., key fobs). In an embodiment, all pairings can be deleted from an AWS 108 module (e.g., controller 202), for example if a switch 204 (e.g., key fob) is lost, rendering that switch inoperable with that system. In another embodiment, switch 204 wirelessly communicates with transceiver 208 and/or controller 202 via a proprietary interference immunity algorithm to enable penetration through high-saturation radio frequency (RF) noise. For example, aspects of the invention are tolerant to Wi-Fi interference, heavy 2.4 GHz noise and interference, and/or motor noise and interference.

In either communications embodiment, depression (i.e., selection) of visual alert button 302 (FIG. 3) activates lights 210 to flash at a predetermined rate. In an exemplary embodiment, the predetermined rate is 90 flashes per minute. The lights 210 will continue to flash as long as the operator depresses visual alert button 302. Upon the operator releasing visual alert button 302, lights 210 will immediately cease flashing. In an embodiment, a backlit visual alert button 302 flashes in unison with lights 210 while the visual alert button 302 is depressed. In another embodiment, a visual alert light 308 (e.g., a light-emitting diode, etc.) flashes in unison with lights 210 while the visual alert button 302 is depressed.

Depression of audible alert button 304 activates lights 210 to flash at the predetermined rate and sound system 214 to emit an audible alert. The lights 210 will continue to flash as long as the operator depresses audible alert button 304. In an embodiment, backlit visual alert button 302 flashes in unison with lights 210 while the audible alert button 304 is depressed. In another embodiment, the visual alert light 308 flashes in unison with lights 210 while the audible alert button 304 is depressed. The sound system 214 will continue to emit the audible alert as long as audible alert button 304 is depressed. In an embodiment, backlit audible alert button 304 illuminates while audible alert button 304 is depressed. In another embodiment, an audible alert light 310 (e.g., a light-emitting diode, etc.) illuminates while audible alert button 304 is depressed.

The audible alert emitted by sound system 214 will continue as long as audible alert button 304 is depressed, up to a predetermined maximum sound activation time (MSAT). In an embodiment, the MSAT is one minute. Once this threshold is reached, the audible alert emitted by sound system 214 will cease can audible alert button 304 and/or audible alert light 310 will begin flashing to indicate that the audible alert has been deactivated.

Upon releasing audible alert button 304, lights 210 immediately cease flashing and the audible alert emitted by sound system 214 will cease (e.g., when on) or begin to reset (e.g., when the MSAT has elapsed). When the MSAT has been reached, AWS 108 automatically begins a recovery sequence that is designed to prevent thermal damage to speaker drivers of sound system 214. In an embodiment, the recovery process is set so that for each one second the audible alert is off, the MSAT recovers by two seconds. For example, a total of approximately thirty seconds of audible alert inactivity will reset the MSAT to its full level. In another embodiment, the time of delay varies based upon climate conditions. In an embodiment, switch 204 includes a means (e.g., a button, a switch, etc.) for reducing the intensity of light emitted by lights 210 by up to about 40% (e.g., for nighttime use, use in tunnels, etc.). In another embodiment, AWS 108 has an automatic dimming function controlled by an externally mounted photoelectric cell that causes the intensity of lights 210 to be reduced (e.g., to one-half intensity, up to 40%, etc.) so as not to blind or otherwise impact a driver's ability to see clearly around the vehicle.

Referring again to FIG. 2, camera activation system 206 is configured to acquire and process image data of vehicle 102 approaching AWS 108, determine when vehicle 102 crosses visual alert threshold 112 and/or audible alert threshold 114, and activate lights 210 and/or sound system 214 in response. The AWS 108 would then be an Automatic Alert Warning System. This feature eliminates reliance on a vehicle operator to activate visual and/or audible alerts. This feature also allows AWS 108 to protect individuals that are working outside the vehicle, such as a highway worker, tow truck operator, AAA motorist responder, utility company operator, law enforcement officer, or the like. In an embodiment, AWS 108 operating in an automatic alert mode may be manually overridden, such as via switch 204 for example.

The camera activation system 206 turns on lights 210 when it detects vehicle 102 heading in its lane or coming too close to AWS 108 at a distance of 1,200 feet, for example. Then if vehicle 102 does not change lanes or otherwise alter its course to avoid protected zone 106, the Automatic System activates lights 210 and sound system 214 to emit visual and audible alerts, respectively, until the danger to protected zone 106 (e.g., the worker and the vehicle) has passed.

The lights 210 give the operator of vehicle 102 a visual warning to avoid protected zone 106. In addition, the audible alert notifies people within protected zone 106 to be alert, that they are now in danger, and they may have just a few seconds to react and move to a safer location like moving in front of their work unit. In an embodiment, workers are able to choose the recommended distance on high-speed roadways as mentioned above, but are also able to choose a lesser distance of activation on lower speed roadways. Distances can be predetermined by design and or even adjustable by the operator for a particular location.

In an embodiment, camera activation system 206 is adjustable for road lane width and distances. One of ordinary skill in the art is familiar with similar types of technology (e.g., for traffic signal camera activations). This makes AWS 108 more adaptable to various work groups and with unmanned vehicles. In one or more embodiments, camera activation system 206 additionally or alternatively utilizes radar, cameras, sensors (e.g., ultrasonic, infrared, etc.), LIDAR, laser, GPS, satellite, and/or any combination thereof to acquire data representative of the location of vehicle 102 and may be referred to as a sensor activation system. In another embodiment, camera activation system 206 and/or controller 202 are configured to record collected data (e.g., image data, etc.), such as to capture situations in which vehicle 102 has a close call with the vehicle on which AWS 108 is mounted and/or protected zone 106, vehicle 102 contacts the vehicle on which AWS 108 is mounted and/or workers in protected zone 106, and the like. The recorded data may be used for law enforcement, insurance, training, and the like, for example.

Figure 4:
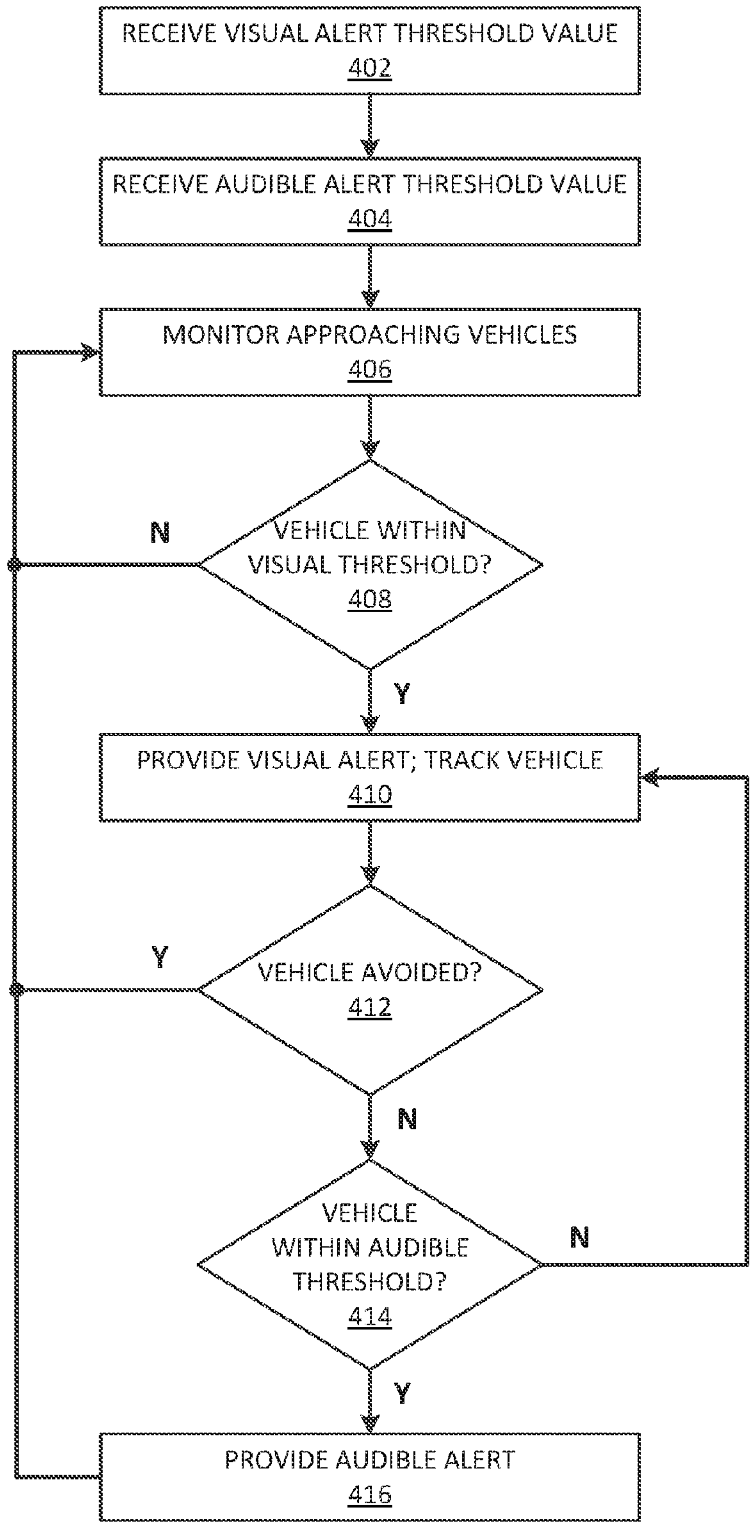
FIG. 4 illustrates an exemplary automatic activation process of the alert warning system of FIG. 2 according to an embodiment.

FIG. 4 illustrates an exemplary automatic process performed by AWS 108 including camera activation system 206 in an embodiment. The controller 202 receives a value for visual alert threshold 112 at step 402 and a value for audible alert threshold 114 at step 404. At step 406, camera activation system 206 monitors vehicles (e.g., vehicle 102) approaching AWS 108. At step 408, processor 202 and/or camera activation system 206 determines whether one or more monitored vehicles have crossed visual alert threshold 112. When no vehicles are within visual alert threshold 112, the process continues to monitor at step 406. When at least one vehicle is within visual alert threshold 112, processor 202 causes lights 210 to emit the visual alert (e.g., turn lights 210 on) and processor 202 and/or camera activation system 206 tracks the vehicle.

At step 412, processor 202 and/or camera activation system 206 determines whether the vehicle has avoided protected zone 106, such as by changing lanes, stopping, altering course, or the like. When the vehicle has taken action to mitigate danger to protected zone 106, the process continues to monitor approaching vehicles at step 406. When the vehicle has not taken any action to avoid protected zone 106, processor 202 and/or camera activation system 206 determines whether the vehicle has crossed audible alert threshold 114, at step 414. When processor 202 and/or camera activation system 206 determines that the vehicle is not within audible alert threshold 114, processor 202 and/or camera activation system 206 continue to provide the visual alert and track the vehicle at step 410. When processor 202 and/or camera activation system 206 determines, at step 414, that at least one vehicle is within audible alert threshold 114, processor 202 causes sound system 214 to emit the audible alert (e.g., produce an audible sound).

Additionally or alternatively, camera activation system 206 may be utilized in a manual mode of operation. In an exemplary embodiment, camera activation system 206 acquires and processes image data of vehicle 102 approaching AWS 108. The resulting images are then displayed on a display device (e.g., LCD screen, etc.) of the vehicle near the AWS operator to enable the AWS operator to see approaching vehicles while also operating the vehicle. In mobile road work operations, for example, this operation permits a single person to both operate the road crew vehicle and operate AWS 108 without relying on the use of mirrors or the like. In another embodiment, the images are displayed on the display device with overlaid visual indicia (e.g., red lines, etc.) of visual alert threshold 112 and/or audible alert threshold 114.

Figure 5:
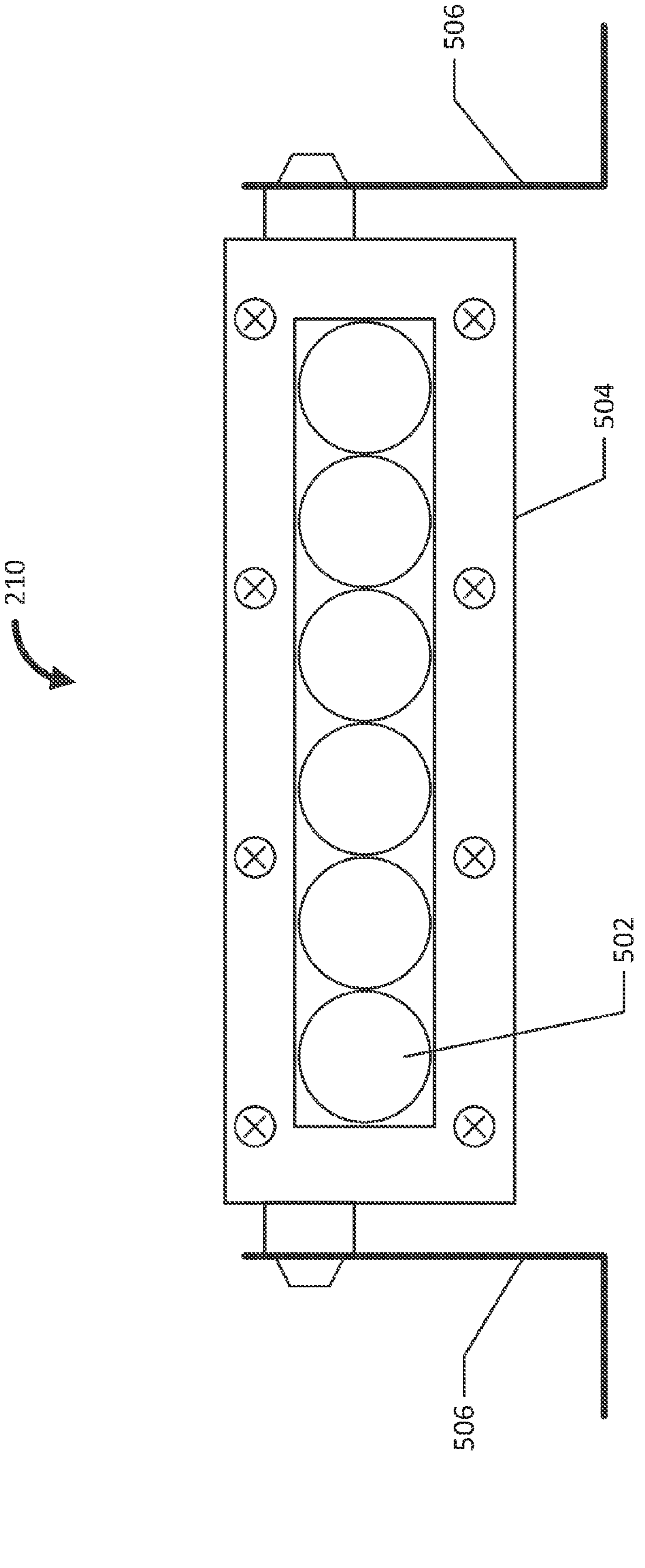
FIG. 5 illustrates an exemplary light of the alert warning system of FIG. 2 according to an embodiment.

Referring again to FIG. 2, lights 210 are configured to emit electromagnetic radiation that is visible to the human eye (e.g., wavelengths from about 390 to 700 nanometers/frequency of about 430-770 THz) to provide the visual alert to the operator of vehicle 102. FIG. 5 illustrates an exemplary light 210 according to an embodiment. In an embodiment, each light 210 includes six white illumination light-emitting diode (LED) light pods 502. One of ordinary skill in the art will understand that the number of LED light pods 502 that comprise each light 210 may vary (e.g., three LED light pods 502 when light 210 is mounted on a car, etc.) and that the illumination color of the LED light pods 502 may vary (e.g., yellow, green, purple, combinations thereof, etc.). The illumination color of LED light pods 502 is also altered by colored lenses in an embodiment. The light 210 is configured for mounting on the rear of any vehicle equipped with an energy absorbing crash protection system or the like, in accordance with an embodiment of the invention. The optics of light 210 create a beam pattern that ensures the illumination from LED light pods 502 is highly directional horizontally (i.e., laterally) to minimize unintended distraction to vehicle operators in non-affected lanes. Moreover, the beam pattern provides adequate vertical visibility, such as for use in hilly environments. In an embodiment, the beam pattern includes a forty degree horizontal spread and a thirty degree vertical spread. The light beam produced by light 210 includes a sharp cut off at the edges of this defined sweet spot. In a further embodiment, LED light pods 502 have instant on/off capability, which means no time is required for warm up. In yet another embodiment, each LED light pod 502 includes a virtually unbreakable polycarbonate lens.

In an exemplary embodiment, each LED light pod 502 has the following specifications:

| | |
|---|---|
| Watts/Amps @ 12 VDC: | 27.2 W/2.26 A |
| Operating Voltage: | 10~41 VDC |
| Kelvin Rating: | 6000 K. |
| Shock Resistance: | GB/T 10485-2007/11.4.4.2 |
| Raw Lumens: | 2600 |
| Operating Temp: | About −40° C. to about 150° C. |
| Lens: | Polycarbonate |
| Optic Purity: | 93% |

Figure 6:
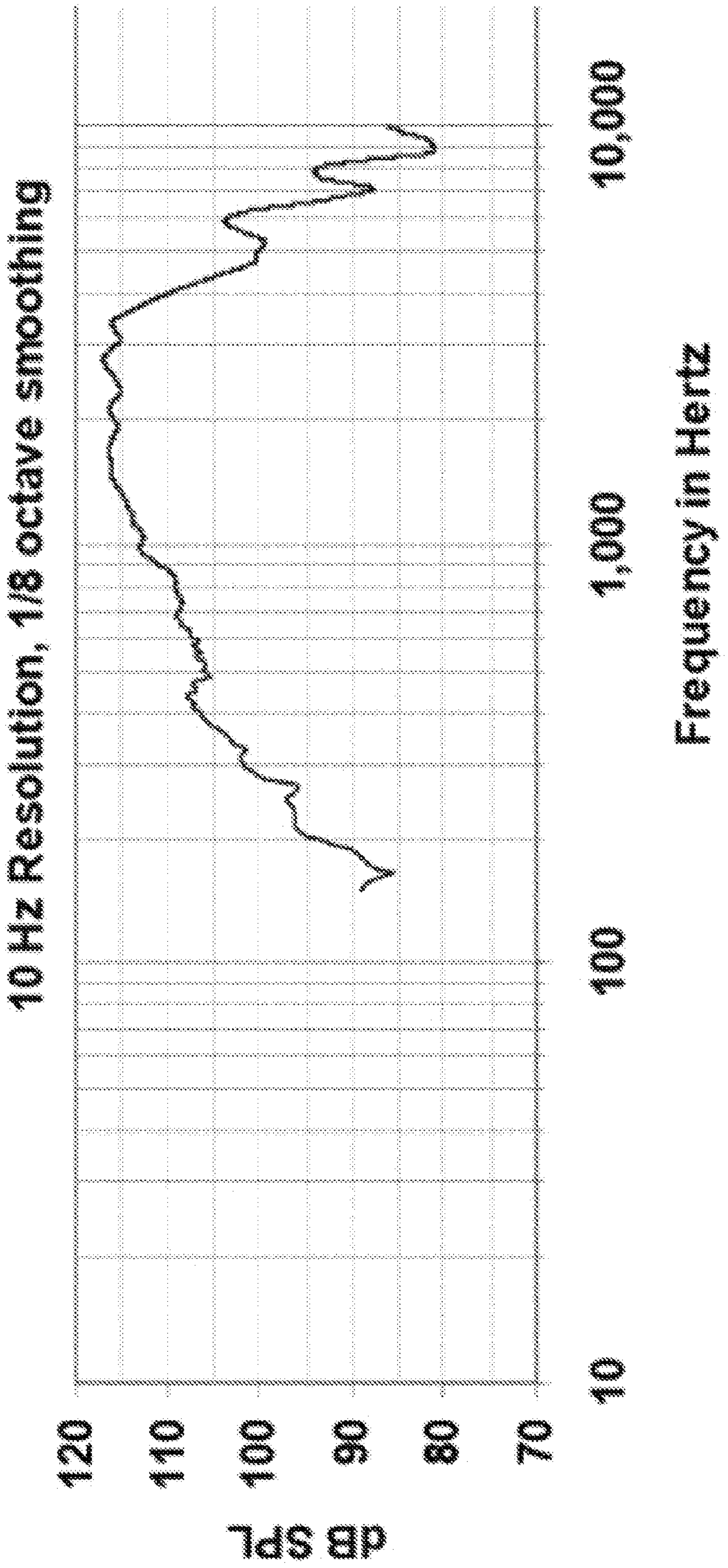
FIG. 6 illustrates a frequency response of the light of the alert warning system of FIG. 2 according to an embodiment.
Figure 7:
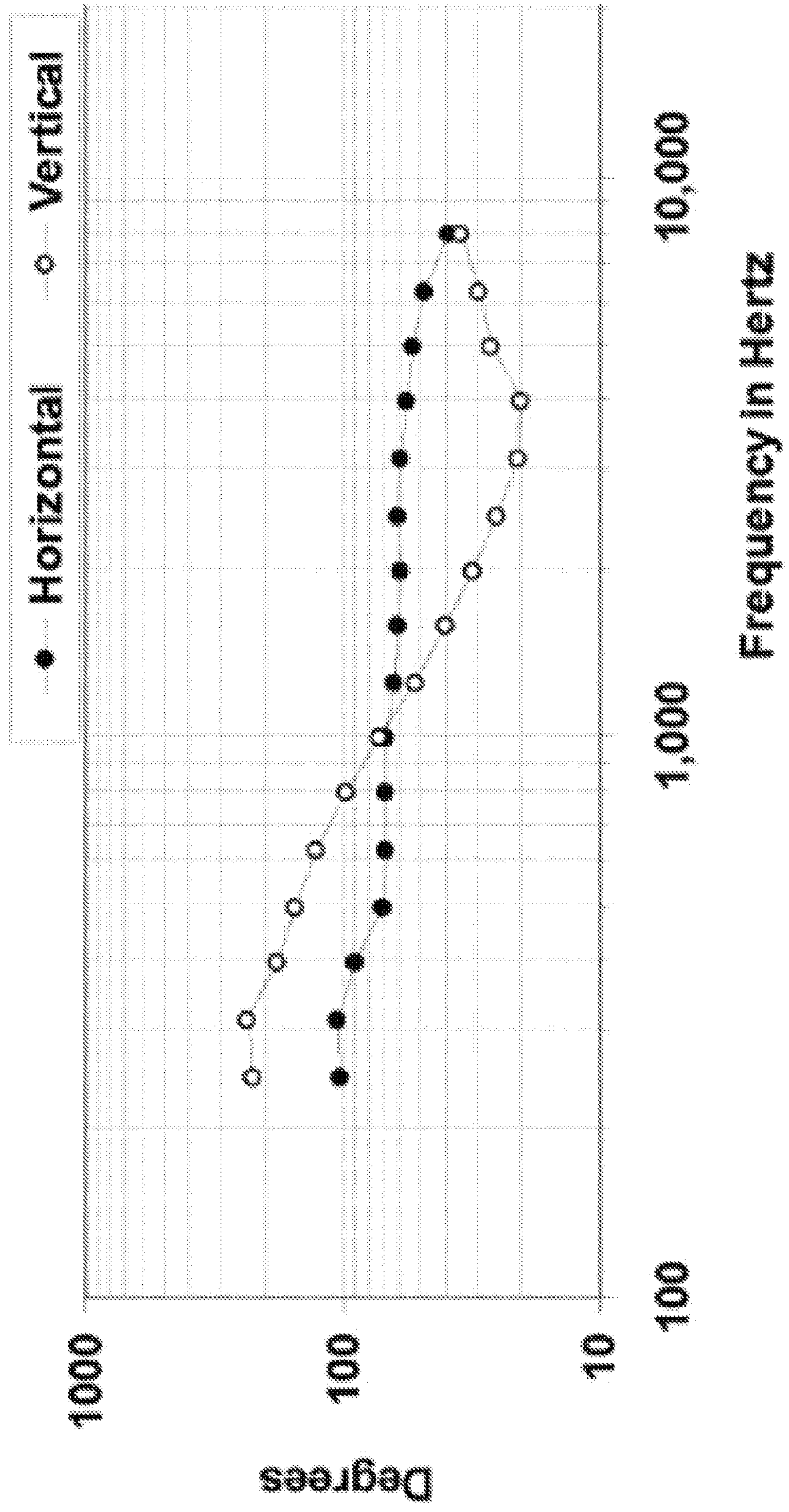
FIG. 7 illustrates a beamwidth of the light of the alert warning system of FIG. 2 according to an embodiment.
Figure 8:
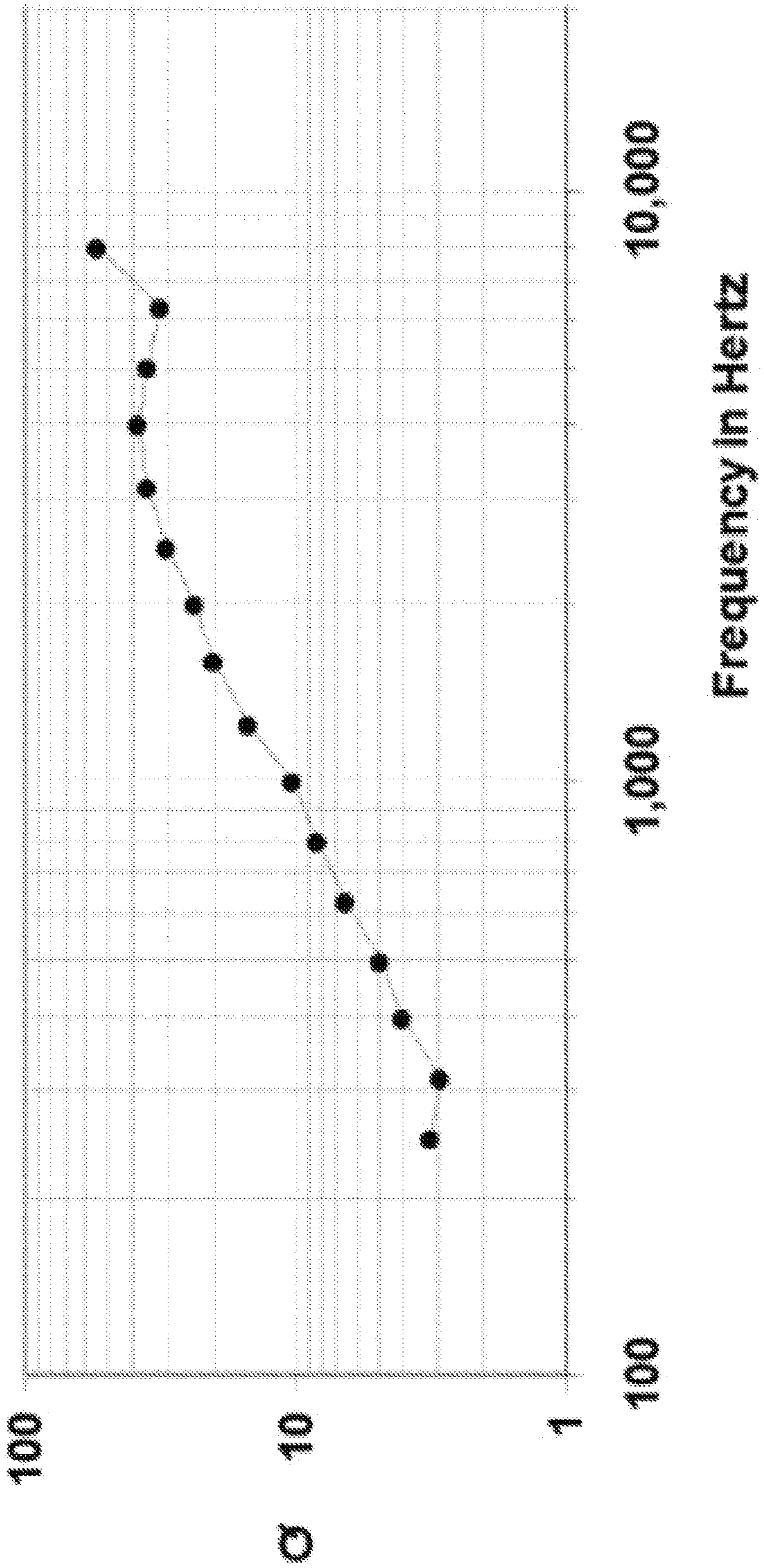
FIG. 8 illustrates an axial directivity of the light of the alert warning system of FIG. 2 according to an embodiment.

In an embodiment, LED light pods 502 are enclosed in an A403 high purity aluminum housing 504. For example, housing 504 may include a UV polyester powder coat finish in accordance with an aspect of the invention. The housing 504 is coupled to stainless steel mounting brackets 506 for providing a universal surface mounting type. In an embodiment, light 210 is 7.59 inches long, 1.73 inches in height, and 3.05 inches deep. In another embodiment, light 210 is electrically coupled to processor 202 via a lead/connector, such as a nineteen inch lead with a waterproof ATP, for example. In yet another embodiment, light 210 includes a pressure relief valve (e.g., military breather) (not shown), over/under voltage protection circuitry (not shown), and/or integrated thermal management circuitry (not shown). FIG. 6 illustrates a frequency response of light 210, according to an embodiment. FIG. 7 illustrates a beamwidth of light 210, according to an embodiment. FIG. 8 illustrates an axial directivity (e.g., “Axial Q”) of light 210, according to an embodiment.

Referring again to FIG. 2, amplifier 212 is configured to increase the power of an audio signal to generate the audible alert. In an embodiment, amplifier 212 is a 400-Watt Class-AD two-channel amplifier. In an embodiment, amplifier 212 includes seals to protect against dust, is comprised of UV inhibitor materials (e.g., Centrex, ASA plastic, etc.), includes corrosion protection on electronic circuitry (e.g., epoxy coated PCB boards), and includes stainless steel hardware. In an exemplary embodiment, amplifier 212 has the following specifications:

| | |
|---|---|
| CEA-2006 Compliant | CEA-2006 Power Rating<br>200 W × 2 @ 4 Ω<br>1.0% THD + N |
| Rated Power (RMS Continuous Power) | 200 Watts × 2 @ 4-Ohm |
| Total Power - (Sum of Rated Power) | 400 Watts |
| Dynamic Power | 223 Watts × 2 @ 4-Ohm |
| Total Harmonic Distortion (THD + Noise) | 2-Ohm: <1.0% |
| Input Sensitivity | 150 mV-12 V |
| Signal Output | None |
| Power Wire Gauge | 8 AWG |
| Speaker Output Connector: | 4-pin Harness |
| Power Wire Gauge | 8 AWG |
| Speaker Output Connector | 4-Pin Harness |

-continued

| | |
|---|---|
| Speaker Wire Gauge | 16 AWG |
| Heat Sink Type | Extruded Aluminum |
| Cooling | Dual Fan Cooled |
| Remote Controls | Optional PLC2 provides Punch Level Control |
| Visual Indicators | Power: Blue LED<br>Protect: Red LED<br>Input Clip: Red LED<br>Output Clip Blue/Red LED |
| Circuit Topology Class | Class-A/D |
| Operating Voltage | 9-16 VDC |
| Recommended Fuse | 60 A |
| Max. Current Draw (13.8 V Sinewave) | 45 A |
| Average Current Draw (13.8 V Music) | 23 A |
| Suggested Alternator | 75 A |
| Shipping Weight | 2.9 Lbs. (1.31 Kg.) |
| Dimensions (H × W × D) | 1.6 × 4.25 × 7 (in.)<br>(4.1 × 10.79 × 17.78 (cm)) |

The sound system 214 is configured to emit electromagnetic radiation that can be perceived by human ears (e.g., wavelengths of about 17 meters to about 17 millimeters/frequency of about 20 Hz to 20 kHz) to provide the audible alert to the operator of vehicle 102 and/or other persons (e.g., passengers in vehicle 102, persons within or near protected zone 106, etc.). In an embodiment, the audible alert includes a unique mixed up sound that grabs the attention of approaching motorists and/or other persons, such as nearby workers, law enforcement officers, and the like. According to aspects of the invention, the sound pattern of the audible alert is unique to AWS 108 and designed so as to not be confused with law enforcement, fire protection, ambulance or other emergency vehicle sirens.

Figure 9:
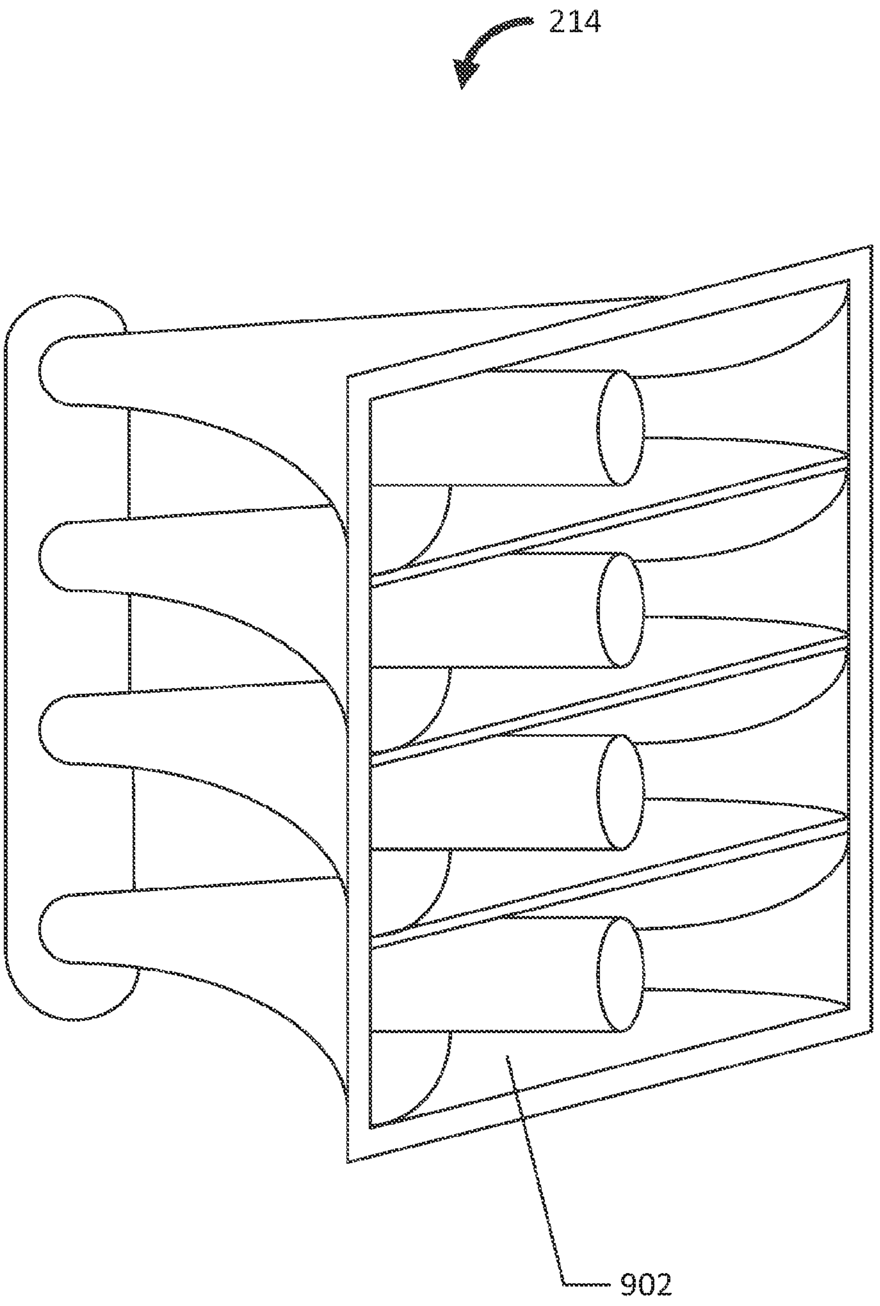
FIG. 9 illustrates an exemplary horn loudspeaker of the sound system of the alert warning system of FIG. 2 according to an embodiment.

FIG. 9 illustrates an exemplary sound system 214 comprised of four horn loudspeakers 902. In an embodiment, the drivers of horn loudspeakers 902 are two-inch (51 mm) exit compression type, specifically designed for midrange frequency response. Each two-inch driver is mounted within a line array design fiberglass exponential horn with an integral fiberglass weather-resistant cover incorporating gland nut cable ingress. In accordance with an aspect of the invention, the horn and driver combination of loudspeakers 902 has an amplitude response of about 600 Hz to 4 kHz dB (+/−4.0 dB), an overall range from about 200 Hz to 10 kHz, with an input capability of about 49 VRMS, 118 dB sensitivity at 1 meter/2.83V between about 600 Hz to 4 kHz, and a nominal impedance of about 4 Ohms. Each driver incorporates a large magnet structure, a one-piece, non-metallic diaphragm/suspension, and a copper-clad aluminum edge-wound voice coil on a Kapton former immersed Ferrofluid. In an exemplary embodiment, the compression ratio is 1.84 to 1. Each diaphragm assembly is field replaceable. In a further embodiment, sound system 214 including the horn and driver system described herein weighs 54.2 pounds (24.58 kg), and when including an optional factory-installed bracket assembly weighs 71.3 pounds (32.34 kg). One of ordinary skill in the art will understand that the number and size of loudspeakers 902 and/or other speakers comprising sound system 214 may vary. For example, smaller speakers may be utilized to generate the audible alert for operators of smaller vehicles (e.g., motorcycles, scooters, etc.) in accordance with an embodiment of the invention.

In an exemplary embodiment, sound system 214 has the following specifications:

| | |
|---|---|
| Operating Range | 400 Hz to 8 kHz<br>600 Hz to 4 kHz (±4 dB) |
| Max Input Ratings | 300 W continuous, 750 W program<br>49 volts RMS, 110 volts momentary peak |
| Usable LF Limit | 400 Hz |
| Throat Entrance Diameter | 4" × 2" |
| Axial Sensitivity (1 W/1 m) | 118 dB SPL (600 Hz to 4 kHz⅓ octave bands)<br>117 dB SPL (250 Hz to 4 kHz speech range) |
| Maximum Output | 143 dB SPL/150 dB SPL (peak) |
| Nominal Impedance | 11 ohms |
| Nominal-6 dB | 60° H (+1°/−4°, 1600 Hz to 4000 Hz) |
| Beamwidth | 20° V (+20°/−0°, 1600 Hz to 4000 Hz) |
| Axial Q | 27.5 1.6 to 4 kHz |
| Axial DI | 14.4 |
| Construction | Hand laminated, reinforced composite fiberglass<br>Interior: Black gelcoat<br>Exterior: Grey gelcoat |
| Drivers | 4 × 200, ferrofluid-cooled |
| Environmental | IEC529 IP65W rating with a minimum |
| Performance | 5-degree downward aiming angle |
| Mounting Hardware | Factory-installed mounting bracket, hot-dipped galvanized 304 stainless steel |
| Dimensions - Height | 28.5 inches (723.9 mm) |
| Dimensions - Width | 24.5 inches (622.3 mm) |
| Dimensions - Depth | 22.5 inches (571.5 mm) |
| Weight (loudspeaker) | 54.2 lbs (24.58 kg) |
| Weight (loudspeaker with bracket assembly) | 71.3 lbs (32.34 kg) |

Referring again to FIG. 2, power source 216 is configured to supply electrical power to one or more components of AWS 108. Exemplary power sources include, but are not limited to, a battery (e.g., automotive battery, Lithium-ion battery, etc.), an electric power generator, a solar cell, and the like. In an embodiment, power source 216 comprises an electrical subsystem of a vehicle (e.g., road crew vehicle) within which AWS 108 is incorporated.

Figure 10:
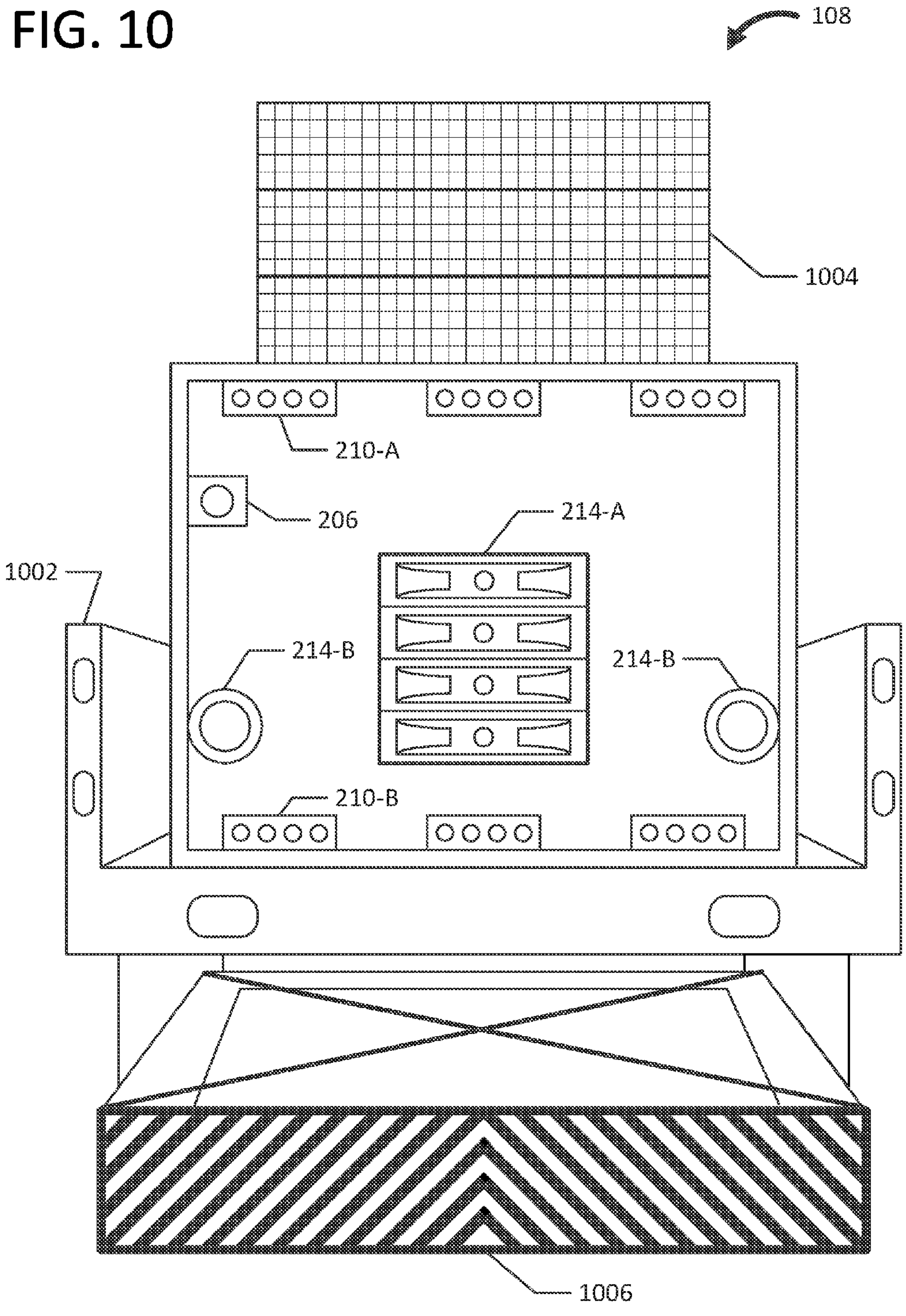
FIG. 10 illustrates a vehicle having a truck mounted attenuator and the alert warning system of FIG. 2 mounted thereon according to an embodiment.

FIG. 10 illustrates an exemplary embodiment in which AWS 108 is utilized on a road crew vehicle 1002 including a message board 1004 and a TMA 1006.

According to aspects of the present invention, AWS 108 employs alert lights 210 in an attempt to alert motorists of a situation on the roadway ahead, such as protected zone 106 (e.g., a work zone or road crew). In an embodiment, an operator of AWS 108 activates lights 210 via switch 204 when he or she notices a motorist driving toward the work zone or road crew and believes the motorist is unaware of the situation ahead. The AWS operator may be in a vehicle positioned closest to the traffic (e.g., road crew vehicle 1002). This vehicle is often referred to as "the hot seat" because of the potential for being hit by a motorist.

In an embodiment, AWS 108 includes six lights 210 mounted on the rear of road crew vehicle 1002. One of ordinary skill in the art will understand that the number of lights 210 may vary (e.g., smaller vehicles, cars, SUVs, and the like may use three lights 210, etc.). The lights are mounted facing the rear (i.e., toward traffic) with three mounted high (210-A) and three mounted low (210-B). The height of lights 210-B from the road surface is approximately the eye-level height of a vehicle operator of an approaching standard car, and the height of lights 210-A from the road surface is approximately the eye-level height of a vehicle operator of an approaching tractor-trailer truck. In an exemplary embodiment, high-mounted lights 210-A are between about 72 and 106 inches above the road surface, and low-mounted lights 210-B are between about 42 and 54 inches above the road surface.

Easy disconnects are used on all wiring so that when the arrow board or message board 1004 is removed, the AWS 108 can also be easily removed and stay attached to one of those devices. In an embodiment, a distance of 1,000 feet directly behind road crew vehicle 1002 (e.g., $d_V$) is used to adjust lights 210 to optimize their effect. The optics create a beam pattern including, for example, a 40 degree horizontal and 30 degree spread to ensure the illumination is highly directional laterally to minimize unintended distraction in non-affected lanes and provides adequate vertical visibility for use in hilly environments. The light beam further has a sharp "cut off" at the edges of this defined "sweet spot." The lights remain visible at all times. Signs and equipment should not obstruct lights 210.

In an embodiment, activation of the visual alert (e.g., lights 210) begins when an approaching vehicle 102 is as far back as 0.2 mile (1,056 feet), or roughly 26-27 road skips, from road crew vehicle 1002. In another embodiment, activation occurs sooner when road crew vehicle 1002 is nearing a hill and/or a curve. The visual alert preferably remains on until the operator of road crew vehicle 1002 and/or camera activation system 206 observes the approaching motorist make a move to change lanes, significantly slow down, or turn on a turn signal showing the motorist is attempting to change lanes. The operator should remember that traffic may be behind the motorist approaching TMA 1006 and the trailing motorists need as much time as possible to react to the TMA 1006 as well so the sooner the first motorist reacts, the sooner the next motorist behind can as well. The operator should not allow a motorist to remain behind the TMA 1006 because this is a dangerous location for the motorist to be in. The operator should activate the visual alert in an attempt to get the approaching motorist's attention to pass when it is safe for them to do so. The operator should not direct traffic with hand signals.

In an embodiment, AWS 108 activates lights 210 early, as soon as the operator and/or camera activation system 206 notices vehicle 102 approaching in their lane, even as far back as a mile marker. Exemplary landmarks for determining distances between road crew vehicle 1002 (e.g., AWS 108) and visual alert threshold 112 and/or audible alert threshold 114 include mile markers that are two tenths of a mile (1,056 feet) apart, white road skips (e.g., 26 per 1,056 feet), and the like. When vehicle 102 alters course (e.g., turns on its turn signal and begins to change lanes) the visual alert can be turned off. The operator and/or camera activation system then watches closely for traffic behind that first vehicle.

In an embodiment, AWS 108 is prepared to activate the visual alert and/or audible alert more than once for a line of traffic heading towards TMA 1006. The first vehicle may very well see TMA 1006 or road crew vehicle 1002 ahead but wait to change lanes as they close-in on TMA 1006. This results in vehicles behind the first vehicle having less distance and time to change lanes. In an embodiment, the visual alert and/or audible alert are turned on early and left on until all the vehicles in the lane leading up to TMA 1006 have cleared that lane.

The visual alert emitted by lights 210 is designed to inform and alert the motorist heading towards TMA 1006 that these lights are different and should give the motorist heading towards them a real sense of "Wow something up ahead is trying to tell me something." Once the motorist sees the visual alert emitted by lights 210, the motorist will not want to continue in the lane the visual alert is activated in, they will change lanes. Video and field surveys have proven that once motorists see the visual alert emitted by lights 210 ahead they do change lanes and do so earlier. That is what the operator wants them to do, this allows for motorist behind them to also have time to change lanes.

In an embodiment, the visual alert and/or audible alert are not left on continuously in order to reduce the chance of desensitizing approaching motorists to a constant set of flashing lights and/or audible alert.

In another embodiment, the AWS 108 includes an audible alert in addition to the visual alert, as further described herein. The audible alert emitted by sound system 214 is designed to work in conjunction with the visual alert on TMA 1006 either in a moving work zone or a stationary work zone. In an embodiment, sound system 214 includes an array of horn loudspeakers 214-A as further described herein. Additionally or alternatively, sound system 214 includes directional speakers 210-B. For example, sound system 214 may include two 100-Watt directional speakers each enclosed in an aluminum housing. One of ordinary skill in the art will understand that varying numbers of speakers and/or speakers of varying sizes are within the scope of the present invention.

In an embodiment, the operator of TMA 1006 activates sound system 214 when motorists continue to approach TMA 1006 and the operator determines the motorists may hit TMA 1006 and/or crews within the work zone (e.g., protected zone 106). In an embodiment, the operator depresses a button (e.g., audible alert button 304) that activates the visual alert (e.g., turning on lights 210) and the audible alert (e.g., turning on sound system 214). The two systems are designed to work together: Lights first and, if no response is detected by the operator that the motorist is changing lanes, the Sound is then activated along with the lights to give a visual as well as an audio alert.

Advantageously, AWS 108 gives motorists as much time as possible to react and change lanes. This needs to happen as early as possible so that traffic behind the first motorist heading toward a work zone or road crew also has time to react and avoid hitting TMA 1006 or work crews the TMA is protecting. Embodiments of the invention save money, simplify work, save time, improve safety, and so forth. If motorists are unresponsive and not changing lanes, then the audible alert is activated to add an audio alert to the visual alert by increasing possible reaction time to change lanes. In an embodiment, the audible alert is generated to additionally or alternatively warn nearby workers, law enforcement officials, and the like of the approaching danger. The goal is to prevent or reduce TMA hits and protect workers on the ground. This will also lessen work vehicles from being damaged and taken out of service, reduce crew injuries, and reduce motorists damaging their vehicles and, of course, injuries to themselves.

In an embodiment, aspects of AWS 108 are attached to road crew vehicle 1002, message board 1004, and/or TMA 1006. The AWS 108 has quick disconnects and stays on the framework of the arrow/message board 1004. It is designed to last as long as the road crew vehicle 1002 and the arrow/message board 1004 are in use. Aspects of sound system 214 are configured to attach to lights 210 already in use and works in conjunction with lights 210, together known as the Alert Warning System.

In a further embodiment, AWS 108 operates in conjunction with a mobile phone application to automatically notify app users when the AWS is activated nearby. In an embodiment, AWS 108 communicates with mobile phone applications executing on mobile computing devices to warn all devices within a predetermined distance (e.g., one mile, etc.) of a lane closure ahead, a shoulder closure ahead, or the like and/or caution that a construction zone is ahead, a law enforcement scene is ahead, a tow vehicle is ahead, a utility vehicle is ahead, or the like. For example, the information (e.g., text, images, sounds, etc.) conveyed by the mobile applications is applicable to the type of unit protected by AWS 108.

In operation, alert lights have greatly reduced accidents and close calls involving mobile and stationary work zones or crews on highways and other roads. Unfortunately, people who are texting and doing other things in their vehicles may not look up in time to see the alert lights. If the lights are not being seen, motorists are more likely to come too close to the work zone or road crew to avoid hitting someone. In an embodiment, AWS 108 activates two rows of flashing lights (210-A, 210-B) when about a mile marker back, 1100 feet or so, and if the cars continue coming the cruise automatically switch the button (e.g., audible alert button 304) to number two and it activates the lights again, along with the audible alert. And the operator can try to do that 800 feet to 1,000 feet; that is a long way back and gives the public depending on their speed, anywhere from 7 to 10 seconds to react to avoid a near miss or an accident. With the activation of the sound, motorists look up, some sooner than others, but they see the lights, they hear the sound. They tend to get over sooner, rather than closer.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An alert warning system comprising:

a plurality of lights configured to be mounted on a first vehicle and provide a visual alert to an operator of a second vehicle when the second vehicle approaches the first vehicle along a thoroughfare; and a sound system configured to be mounted on the first vehicle and provide an audible alert to the operator of the approaching second vehicle, the visual and audible alerts being responsive to a two-part initiation event, the two-part initiation event having a first part for initiating the visual alert when the approaching second vehicle reaches a first predetermined distance from a safety target along the thoroughfare and a second part for initiating the audible alert when the approaching second vehicle reaches a second predetermined distance from the safety target, the second predetermined distance being less than the first predetermined distance.

2. The system of claim 1, further comprising a sensor-based activation system for automatically generating at least one of the first and second parts of the initiation event to initiate at least one of the visual and audible alerts.

3. The system of claim 1, wherein the first vehicle is a road crew vehicle and wherein the plurality of lights are mounted on at least one of a message board, a frame, and a truck-mounted attenuator of the road crew vehicle.

4. The system of claim 3, wherein the road crew vehicle has a truck mounted attenuator mounted thereon.

5. The system of claim 1, further comprising a momentary switch for generating the first part of the initiation event when an operator depresses the momentary switch, the first part of the initiation event only causing the plurality of lights to provide the visual alert while the momentary switch is depressed.

6. The system of claim 5, further comprising a latching switch for generating the second part of the initiation event when operator depresses the latching switch, the second part of the initiation event causing the plurality of lights to provide the visual alert and the sound system to provide the audible alert until the operator depresses the latching switch again.

7. The system of claim 1, wherein the sound system comprises a plurality of horn loudspeakers.

8. The system of claim 7, wherein the horn loudspeakers have an amplitude response of about 600 Hz to 4 kHz dB, a beamwidth of about 60 degrees in the horizontal plane and about 20 degrees in the vertical plane, and an axial directivity factor of about 27.5.

9. The system of claim 1, wherein the visual alert is highly directional laterally to minimize unintended distraction to non-affected vehicle operators.

10. The system of claim 9, wherein the visual alert has a beam pattern of about 40 degrees horizontal spread and about 30 degrees vertical spread and a sharp cutoff at the edges of the beam pattern.

11. A method comprising:

providing a visual alert to an operator of a vehicle approaching a protected zone along a thoroughfare by emitting light from a plurality of light units when the approaching vehicle reaches a first predetermined distance from the protected zone, wherein the plurality of light units are mounted on an alert vehicle positioned between the approaching vehicle and the protected zone along the thoroughfare; and providing an audible alert to the operator of the approaching vehicle by emitting sound from a sound system mounted on the alert vehicle when the approaching vehicle reaches a second predetermined distance from the protected zone, wherein the second predetermined distance is less than the first predetermined distance.

12. The method of claim 11, further comprising automatically generating, by a sensor activation system, an initiation signal to initiate at least one of the visual alert and the audible alert.

13. The method of claim 11, wherein the alert vehicle is a road crew vehicle and wherein the plurality of light units are mounted on at least one of a message board, a frame, and a truck-mounted attenuator of the road crew vehicle.

14. The method of claim 13, wherein the road crew vehicle has a truck mounted attenuator mounted thereon.

15. The method of claim 11, further comprising generating a first initiation signal to initiate the visual alert when an operator depresses a momentary switch, and said providing the visual alert continuing while the momentary switch is depressed.

16. The method of claim 15, further comprising generating a second initiation signal to initiate the audible alert when the operator depresses a latching switch, and said providing the visual alert and providing the audible alert continuing while the latching switch is depressed.

17. The method of claim 11, wherein the sound system includes a plurality of horn loudspeakers.

18. The method of claim 17, wherein the horn loudspeakers have an amplitude response of about 600 Hz to 4 kHz dB, a beamwidth of about 60 degrees in the horizontal plane and about 20 degrees in the vertical plane, and an axial directivity factor of about 27.5.

19. The method of claim 11, wherein the visual alert is highly directional laterally to minimize unintended distraction to non-affected vehicle operators.

20. The method of claim 19, wherein the visual alert has a beam pattern of about 40 degrees horizontal spread and about 30 degrees vertical spread and a sharp cutoff at the edges of the beam pattern.

* * * * *